(12) United States Patent
Papendick et al.

(10) Patent No.: US 11,628,954 B2
(45) Date of Patent: Apr. 18, 2023

(54) ASSEMBLY SYSTEM FOR AN AUTOMATED INTERNAL ASSEMBLY OF AN AIRCRAFT FUSELAGE

(71) Applicant: Airbus Operations GmbH, Hamburg (DE)

(72) Inventors: Wolfgang Papendick, Hamburg (DE); Ingo Krohne, Hamburg (DE)

(73) Assignee: Airbus Operations GmbH

( * ) Notice: Subject to any disclaimer, the term of this patent is extended or adjusted under 35 U.S.C. 154(b) by 486 days.

(21) Appl. No.: 16/451,495

(22) Filed: Jun. 25, 2019

(65) Prior Publication Data
US 2020/0002025 A1 Jan. 2, 2020

(30) Foreign Application Priority Data
Jun. 27, 2018 (DE) ...................... 10 2018 210 507.3

(51) Int. Cl.
*B64F 5/10* (2017.01)
*B64C 1/06* (2006.01)
*B23Q 9/00* (2006.01)

(52) U.S. Cl.
CPC ................ *B64F 5/10* (2017.01); *B64C 1/061* (2013.01); *B23Q 9/0042* (2013.01); *B23Q 2210/008* (2013.01)

(58) Field of Classification Search
CPC ... B23Q 9/0042; B23Q 2210/008; B64F 5/10; B21J 15/142
See application file for complete search history.

(56) References Cited

U.S. PATENT DOCUMENTS 4,662,556 A * 5/1987 Gidlund ............... B23Q 9/0014
227/111
5,661,892 A * 9/1997 Catania ................... B21J 15/10
408/1 R (Continued)

FOREIGN PATENT DOCUMENTS

DE        69829255 T2      1/2006
EP        0917920 A2       5/1999
WO        WO-2008104266 A1 *  9/2008   ............. B23Q 1/621

OTHER PUBLICATIONS

Machine Translation of WO2008104266A1 (Year: 2008).*
Seater B., "5-Axis Flex Track System", SAE Technical Paper, 2012-01-1859, 2012.

*Primary Examiner* — Michael W Hotchkiss
(74) *Attorney, Agent, or Firm* — Lerner, David, Littenberg, Krumholz & Mentlik, LLP

(57) ABSTRACT

An assembly system for an automated internal assembly on a curved assembly surface of an aircraft fuselage includes two assembly rails shaped in accordance with a curvature of the assembly surface such that they follow a longitudinal direction or a peripheral direction of the aircraft fuselage, so that the assembly rails are fastenable in the aircraft fuselage, along the longitudinal direction or along the peripheral direction of the aircraft fuselage, parallel to one another and parallel to the assembly surface of the aircraft fuselage; an assembly slide configured to slide along the assembly rails; and a tool supported by the assembly slide and configured to perform an assembly step; wherein the assembly slide has an assembly axis, along which the tool is movable relative to the assembly slide; and wherein the assembly axis is configured such that it follows the curvature of the assembly surface of the aircraft fuselage.

7 Claims, 1 Drawing Sheet

(56) References Cited

U.S. PATENT DOCUMENTS

| | | | | |
|---|---|---|---|---|
| 5,842,668 A * | 12/1998 | Spencer | B64D 11/003 | 312/246 |
| 6,011,482 A * | 1/2000 | Banks | B21J 15/142 | 29/407.05 |
| 6,073,326 A * | 6/2000 | Banks | B21J 15/10 | 227/111 |
| 6,088,897 A * | 7/2000 | Banks | B21J 15/10 | 227/62 |
| 6,098,260 A * | 8/2000 | Sarh | B21J 15/10 | 227/52 |
| 6,172,374 B1 * | 1/2001 | Banks | B21J 15/10 | 250/559.3 |
| 6,505,393 B2 | 1/2003 | Stoewer et al. | | |
| 6,883,753 B1 * | 4/2005 | Scown | B64C 1/06 | 244/118.1 |
| 7,003,860 B2 * | 2/2006 | Bloch | B21J 15/142 | 29/464 |
| 7,216,408 B2 * | 5/2007 | Boyl-Davis | B23Q 9/0014 | 408/98 |
| 8,100,360 B2 * | 1/2012 | Gross | B64C 1/066 | 244/119 |
| 8,365,376 B2 * | 2/2013 | Reid | B23Q 9/0042 | 29/244 |
| 8,403,266 B2 * | 3/2013 | Fokken | B64C 1/066 | 244/131 |
| 8,454,261 B2 * | 6/2013 | Horst | B64D 11/003 | 403/324 |
| 8,528,859 B2 * | 9/2013 | Gross | B64D 11/003 | 312/246 |
| 8,690,102 B2 * | 4/2014 | Umlauft | B64D 11/0696 | 244/131 |
| 8,790,050 B2 * | 7/2014 | Marguet | B23B 39/00 | 408/19 |
| 9,308,995 B2 * | 4/2016 | Spellman | B64D 11/00 | |
| 9,511,863 B2 * | 12/2016 | Schneider | A47B 46/00 | |
| 9,573,269 B2 * | 2/2017 | Albert | B25H 5/00 | |
| 9,610,693 B2 * | 4/2017 | Sarh | B25J 15/0052 | |
| 9,656,319 B2 * | 5/2017 | Sarh | B21J 15/32 | |
| 10,183,367 B2 * | 1/2019 | Jesu Plu | G05B 19/402 | |
| 10,265,760 B2 * | 4/2019 | Dixon | B23B 35/00 | |
| 10,500,710 B2 * | 12/2019 | Albert | B23Q 9/0042 | |
| 10,556,266 B2 * | 2/2020 | Dixon | B21J 15/142 | |
| 10,723,484 B2 * | 7/2020 | Chan | B21J 15/32 | |
| 10,773,830 B2 * | 9/2020 | Chan | B23Q 9/0007 | |
| 2002/0131836 A1 * | 9/2002 | Ferrari | B23Q 39/04 | 409/212 |
| 2002/0152598 A1 | 10/2002 | Sarh | | |
| 2003/0116331 A1 * | 6/2003 | Boyl-Davis | B23Q 1/621 | 173/1 |
| 2005/0265798 A1 * | 12/2005 | Boyl-Davis | B23Q 9/0014 | 408/76 |
| 2007/0036618 A1 * | 2/2007 | Fritsche | B23Q 1/28 | 408/56 |
| 2008/0181733 A1 * | 7/2008 | Wright | B23Q 9/0042 | 408/1 R |
| 2008/0244888 A1 * | 10/2008 | Sarh | B21J 15/142 | 29/525.01 |
| 2008/0277527 A1 * | 11/2008 | Fokken | B61D 17/18 | 244/118.1 |
| 2009/0026318 A1 * | 1/2009 | Gross | B64D 11/003 | 244/131 |
| 2010/0074673 A1 * | 3/2010 | Horst | B61D 37/003 | 403/14 |
| 2010/0243805 A1 * | 9/2010 | Gross | B64C 1/40 | 244/119 |
| 2012/0114439 A1 | 5/2012 | Buttrick et al. | | |
| 2012/0228092 A1 * | 9/2012 | Erlbacher, II | B23K 37/0258 | 198/837 |
| 2014/0152159 A1 * | 6/2014 | Schneider | B64D 11/003 | 312/248 |
| 2014/0339394 A1 | 11/2014 | Perla et al. | | |
| 2014/0368316 A1 * | 12/2014 | Reid | B23Q 17/2233 | 340/8.1 |
| 2017/0028520 A1 * | 2/2017 | Jesu Plu | G05B 19/402 | |
| 2018/0043438 A1 | 2/2018 | Dixon et al. | | |
| 2018/0148195 A1 | 5/2018 | Chan, Jr. et al. | | |
| 2018/0169768 A1 * | 6/2018 | Albert | B64F 5/10 | |
| 2019/0329905 A1 * | 10/2019 | Chan | B25J 5/02 | |

\* cited by examiner

ASSEMBLY SYSTEM FOR AN AUTOMATED INTERNAL ASSEMBLY OF AN AIRCRAFT FUSELAGE

FIELD OF THE INVENTION

The present invention relates to an assembly system for an automated internal assembly of an aircraft fuselage. The present invention further relates to an aircraft fuselage having such an assembly system.

BACKGROUND OF THE INVENTION

A fuselage shell of a modern aircraft typically consists of a load-bearing frame structure made up of rigid stiffening elements which are covered with an outer skin. The load-bearing frame structure generally comprises, inter alia, ribs, which are oriented in a peripheral direction of the aircraft fuselage, and stringers, which are aligned in a longitudinal direction of the aircraft fuselage. A standard rib is, in turn, formed of a plurality of curved rib segments, which are connected both to one another and to the stringers and/or the outer skin by means of connecting elements.

As part of the advancing automation of the production process for aircraft, semi-automated or fully automated systems have already long been used for certain production steps, such as, for example, for riveting operations, drillings, milling operations, bondings, etc. For instance, different systems exist for the performance of riveting operations on an outer side of a fuselage shell. Such an approach is known under the designation "Automated Riveting Assembly System" (ARAS), see, for example, printed publication U.S. Pat. No. 6,505,393 B2. Another example is the so-called "Flex Track System", cf. printed publication Seater B., "5-Axis Flex Track System", SAE Technical Paper, 2012-01-1859, 2012. In such systems, guide rails are fastened via suction cups or the like to an outer side of a fuselage. Tools, such as, for example CNC machines, i.e. machine tools with "Computerized Numerical Control", (CNC), for example drilling and/or riveting machines, can, in turn, be guided along the guide rails.

In contrast hereto, assembly operations inside aircraft fuselages are harder to automate because of the restricted accessibility. Robot-based approaches therefore typically require, for instance, costly measuring systems in order to achieve the accuracy demanded. In order to achieve an exact vertical alignment of the tools with respect to an assembly surface of the fuselage, complex metrological or mechanical systems are sometimes used.

Printed publication US 2018/0148195 A1 describes an automated production system for an interior of an aircraft fuselage, in which an automatic drilling machine or the like is guided along a rail. The rail here runs in the peripheral direction and is fastened via suction cups to a pressure dome of an aft pressure bulkhead. The tool comprises an end-effector, which can be rotated via an actuator perpendicular to an assembly surface of the aircraft fuselage. For this purpose, the system comprises a measuring device (in particular laser-based), which generates the hereto necessary control signals. In one specific embodiment, this system can be configured in the style of a bridge between two such guide rails.

BRIEF SUMMARY OF THE INVENTION

Against this background, aspects of the present invention may provide simplified solutions for the automated internal assembly of aircraft fuselages.

According to an aspect, an assembly system for an automated internal assembly on a curved assembly surface of an aircraft fuselage is provided. The assembly system comprises two assembly rails, which are shaped in accordance with a curvature of the assembly surface of the aircraft fuselage such that they follow a longitudinal direction of the aircraft fuselage or a peripheral direction of the aircraft fuselage, so that the assembly rails are fastenable in the aircraft fuselage, along the longitudinal direction of the aircraft fuselage or along the peripheral direction of the aircraft fuselage, parallel to one another and parallel to the assembly surface of the aircraft fuselage; an assembly slide, which is configured to slide along the assembly rails; and a tool, which is supported by the assembly slide and which is configured to perform an assembly step; wherein the assembly slide has at least one assembly axis, along which the tool is configured such that it is movable relative to the assembly slide; and wherein the assembly axis is configured such that it follows the curvature of the assembly surface of the aircraft fuselage.

In addition, an aircraft fuselage is provided. The aircraft fuselage comprises a curved assembly surface; two assembly rails, which are fastened within the aircraft fuselage along a longitudinal direction of the aircraft fuselage or along a peripheral direction of the aircraft fuselage, parallel to one another and parallel to the assembly surface of the aircraft fuselage; an assembly slide, which is configured to slide along the assembly rails over the assembly surface of the aircraft fuselage; and a tool, which is supported by the assembly slide and which is configured to perform an assembly step on the assembly surface of the aircraft fuselage; wherein the assembly slide has at least one assembly axis, along which the tool is configured such that it is movable between the assembly rails relative to the assembly slide; and wherein the assembly axis is configured parallel to the assembly surface of the aircraft fuselage such that it follows a curvature of the assembly surface of the aircraft fuselage.

An idea which underlies the present invention consists in putting in place a simple linear mechanical (rail) system, which is aligned such that it follows the curved assembly surface of the aircraft fuselage. In addition to two rails in the peripheral direction or in the longitudinal direction, in particular there is hereto provided an assembly axis which enables a (lateral, in particular perpendicular) movement of a tool relative to an assembly slide guided along the rails. The assembly axis is adapted in such a way to the path of the assembly surface that the tool is at all times automatically aligned in relation to the assembly surface of the aircraft fuselage. The alignment is here achieved solely on the basis of the geometric configuration of the assembly rails and the assembly axis, i.e. without the need for additional measurements or specific actuators. The possible range of movement of the tool or of the assembly slide is here adapted to the curvature of the assembly surface. This is of relevance not least in regions of the aircraft fuselage with complex curvature, for example in a conically tapered tail region in which not just a curvature in the peripheral direction, but likewise a curvature in the longitudinal direction, has to be taken into account. Through the use of linear structures, unlike in known robot-supported systems, a high accuracy can be achieved, even at high process speed and with little installation effort. At the same time, the linear guide structures of the invention, i.e. the assembly rails and the assembly axis, are of lightweight design. Heavy and complex holding devices, assembly stands and/or scaffolds can be avoided. The assembly system according to the invention can be provided, for instance, in the form of individual modules, which respectively cover a predefined fuselage region of the aircraft fuselage, for example one or more fuselage segments in the longitudinal direction and/or in the transverse direction. Such modules can then, if necessary, be connected to one another in the transverse and/or longitudinal direction in order to incrementally extend the range of movement of the system. The modules can here be designed such that they are optimized for the geometry of the respective fuselage portion. In this way, the present system is able to be realized without great effort for fuselages which are complexly shaped according to choice. For instance, each module can comprise rail segments which are configured geometrically in accordance with the respective fuselage portion. Finally, the present invention provides a system which is markedly more robust, more rapid, more precise and more simple than traditional solutions based on metrological approaches. The present system can be operated, for instance, in the usual manner via (computer-aided) numerical control systems.

As the tool, any type of machine tools or end-effectors which can support an automated production can in principle be considered. Tools within the meaning of the invention comprise, in particular, CNC machines or the like, for example (multiaxial) drilling machines, riveting machines, milling machines, bonding machines, etc. In addition, the assembly system according to the invention can be coupled with further semi-automatic and/or fully automatic systems. For instance, an assembly system outside the fuselage can be communicatively connected to the present system. In this way, a combined automated assembly system, which enables coordinated assembly operations such as, for instance, joining operations, e.g. riveting operations or similar, along the fuselage from inside and out, can be created.

Advantageous embodiments and refinements emerge from the description with reference to the figures.

According to one refinement, the at least one assembly axis can be arranged perpendicular to the assembly rails. The assembly slide can thus be moved by means of the assembly rails in the transverse direction or in the longitudinal direction, whilst the tool can simultaneously be positioned perpendicular thereto, in particular between the rails. Alternatively or additionally, one or more assembly axes can equally be arranged at a different angle with respect to the assembly rails.

According to one refinement, the at least one assembly axis can be configured as a rail. The tool can be configured to slide relative to the assembly slide along the at least one assembly axis. For instance, the assembly axis/axes and/or the assembly rails can be made of a metallic material such as a metal, a metal alloy or a metallic material combination.

According to one refinement, two assembly axes can be provided, between which the tool is supported by the assembly slide. In this refinement, a double rail system is thus created to some extent from rails standing perpendicular or at an oblique angle to one another, wherein the tool can be brought into any chosen positions along the assembly surface of the aircraft fuselage.

According to one refinement, the assembly slide can have an alignment system. The alignment system can be configured to register a reference structure on the assembly surface of the aircraft fuselage and, on the basis thereof, to position the tool relative to the assembly surface. The positioning is here realized via a movement of the tool or the assembly slide along the assembly rails and/or the assembly axes. Structures, such as, for example, bores, pins, attachments, labels, etc. which are already present (possibly for other purposes) can serve as reference points with respect to the aircraft fuselage and can thus be used to precisely position the tools over a place to be machined on the assembly surface of the aircraft fuselage. In this way, elaborate measuring systems and/or a high programming effort can be avoided. For this purpose, the alignment system can be configured optically, for instance, with a camera or the like. Furthermore, the alignment system can be communicatively connected to drives of the assembly slide and/or of the tool.

According to one refinement, the assembly rails can be fastened to stiffening elements of the aircraft fuselage. For instance, the assembly rails can be positively coupled with the stiffening elements, so that in particular a necessary curvature of the assembly rails can be predefined by reference to a path of the stiffening elements.

According to one refinement, the assembly rails can be fastened to the stiffening elements via assembly bores of the stiffening elements. Structural features of the stiffening elements can thus serve to precisely align the assembly rails with respect to the stiffening elements, and hence to the assembly surface.

According to one refinement, the stiffening elements can be configured as ribs. For instance, the assembly rails can run in the longitudinal direction. In this concrete example, the ribs can serve to some extent as transoms of the assembly rails, wherein the rails can be fastened to the ribs via connecting rods or differently shaped coupling elements. In another example, the assembly rails can run in the transverse direction and, in this case, along the ribs, wherein respectively an assembly rail can be coupled with a rib. Additionally or alternatively, further stiffening elements such as stringers or the like can, however, equally be used.

The above embodiments and refinements are able, wherever sensible, to be mutually combined according to choice. Further possible embodiments, refinements and implementations of the invention also comprise non-explicitly stated combinations of features of the invention which have been previously described or which are described below with respect to the illustrative embodiments. In particular, the person skilled in the art will here also add individual aspects as improvements or addenda to the respective basic form of the present invention.

BRIEF DESCRIPTION OF THE DRAWINGS

The present invention is explained in greater detail below by reference to the illustrative embodiments defined in the schematic figures. wherein.

DETAILED DESCRIPTION

Figure 1:
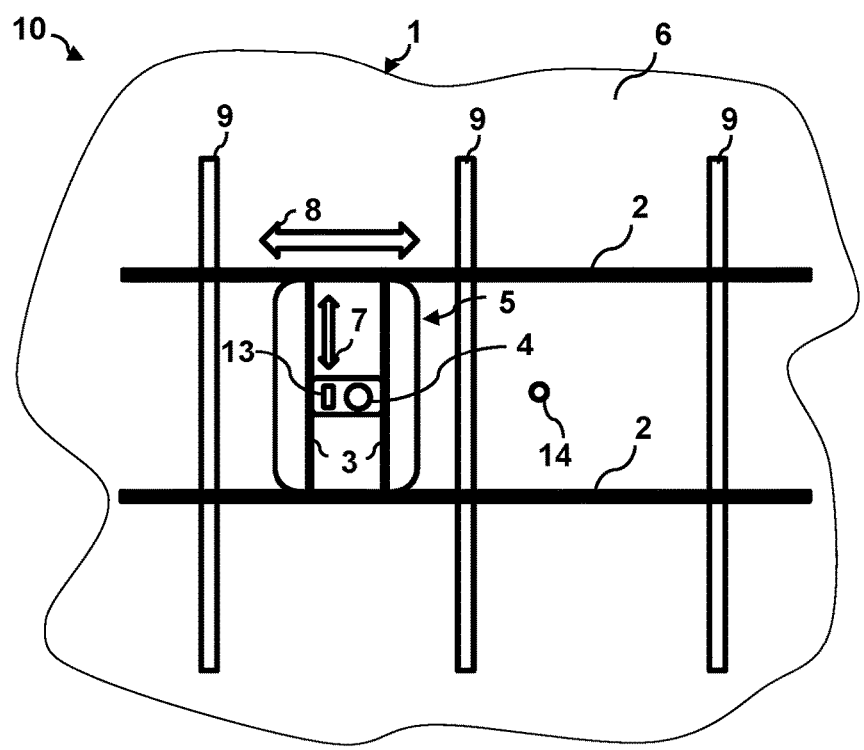
FIG. 1 shows a schematic front view of an assembly system according to one embodiment of the invention.

The appended figures are intended to impart a further understanding of the embodiments of the invention. They illustrate embodiments and serve, in association with the description, to explain principles and concepts of the invention. Other embodiments and many of the stated advantages emerge in view of the drawings. The elements of the drawings are not necessarily shown true to scale relative to one another.

In the figures of the drawing, same, functionally identical and like-acting elements, features and components—unless otherwise stated—are respectively provided with the same reference symbols.

FIG. 1 shows a schematic front view of an assembly system 10 according to one embodiment of the invention along a longitudinal direction 8 of an aircraft fuselage 1, for example a passenger aircraft. The assembly system 10 is portrayed in FIG. 2 in a side view perpendicular to the longitudinal direction 8, i.e. transversely to the aircraft fuselage 1. The assembly system 10 serves for the automated internal assembly of the aircraft fuselage 1 along the longitudinal direction 8 of the aircraft fuselage 1.

The aircraft fuselage 1 has a fuselage inner face, for example an inner side of an outer skin of the aircraft fuselage 1, which serves as an assembly surface 6 for assembly operations and on which a multiplicity of stiffening elements 9 are fastened. In the shown exemplary embodiment, the stiffening elements 9 are ribs, which in the usual manner are curved along a peripheral direction 7 of the aircraft fuselage 1 (cf. FIG. 2). Each stiffening element 9 has a multiplicity of mounting bores 11, via which connecting rods, connecting struts and/or other connecting elements 12 are coupled to the stiffening elements 9. The connecting elements 12, in turn, hold two assembly rails 2, which are arranged along a longitudinal direction 8 of the aircraft fuselage 1 within the aircraft fuselage 1, parallel to one another and parallel to the assembly surface 6 of the aircraft fuselage 1. This means, inter alia, that the assembly rails 2 can be configured straight in certain regions of the aircraft fuselage 1, for example in fuselage sections or fuselage segments in which the aircraft fuselage 1 is configured cylindrically with a fixed diameter. On the other hand, this equally means that the assembly rails 2 can be configured curved, for example in fuselage regions in which the aircraft fuselage 1 has a varying diameter, i.e. the fuselage is curved not only in the peripheral direction 7, but likewise in the longitudinal direction 8. For instance, a typical aircraft fuselage tapers at the tail, with a conically tapering in the longitudinal direction.

The assembly system 10 further comprises an assembly slide 5, which is configured to slide along the assembly rails 2 over the assembly surface 6 of the aircraft fuselage 1. The assembly slide 5 here serves as a holder for a tool 4 and/or an end-effector. The tool 4 can be constituted by any chosen assembly tool or by any chosen assembly machine which is configured to perform an assembly step on the assembly surface 6 of the aircraft fuselage 1. For instance, the tool 4 can be a drilling machine, a riveting machine, a milling machine, etc., which is suitable for the automated performance of assembly operations on the aircraft fuselage 1. In principle, the tool 4 can equally be configured to perform an assembly step on any chosen fuselage structure of the aircraft fuselage 1, for example on one of the stiffening elements 9.

The assembly slide 5 has two assembly axes 3, along which the tool 4 is configured such that it is movable relative to the assembly slide 5. In the exemplary embodiment of FIGS. 1 and 2, the assembly axes 3 are integrated as rails into the assembly slide 5, wherein the rails are curved in accordance with the path of the assembly surface 6. The assembly axes 3 are thus configured parallel to the assembly surface 6 of the aircraft fuselage 1 such that they follow a curvature of the aircraft fuselage 1. In the concrete example of FIGS. 1 and 2, the assembly axes 3 are arranged perpendicularly on the assembly rails 2, parallel to the stiffening elements 9, i.e. they are curved, like the stiffening elements 9, along the peripheral direction 7 of the aircraft fuselage 1 (cf. FIG. 2).

In conjunction, the assembly rails 2 and the assembly axes 3 predefine degrees of range of movement for assembly operations of the tool 4, wherein the assembly rails 2 and the assembly axes 3 jointly ensure that the tool 4 is automatically aligned perpendicular to the assembly surface 6, without the need for a measuring system or the like. The vertical alignment of the tool 4 is to some extent passively predefined by the geometric guidance of the assembly rails 2 and assembly axes 3. To this end, the assembly slide 5 can slide along the assembly rails 2 in the longitudinal direction 8 of the aircraft fuselage 1. At the same time, the tool 4 can slide along the assembly axes 3 of the assembly slide 5 in the peripheral direction 7 (cf., in particular, FIG. 2). The sliding movement of the assembly slide 5 and/or of the tool 4 can be translated, for instance, by appropriate drives known to the person skilled in the art, such as, for instance, electric motors such as stepping motors or the like. These drives can, in particular, be integrated in the assembly slide 5. Because of the particular arrangement of the system of assembly rails 2 and assembly axes 3, the tool 4 is at all times correctly adjusted with respect to the assembly surface 6. In particular, curvatures of the assembly surface 6 or of the aircraft fuselage 1 in the longitudinal direction 8 are taken into account, since the assembly rails 2 run parallel to the assembly surface 6 and accordingly thus follow a curvature of the aircraft fuselage 1. As will be clear to the person skilled in the art, this automatic alignment of the tool 4 can equally be used to perform assembly operations which are to be realized, for instance, rotated through 90° relative to the outer skin of the aircraft fuselage 1, for example an assembly step such as a joining operation, for example a riveting operation or a drilling, can be realized on one of the stiffening elements 9, rotated relative to the assembly surface 6 of FIGS. 1 and 2, in particular along the longitudinal direction 8, i.e. rotated through 90° relative to the assembly surface 6 (for example in accordance with the mounting bores 11).

The assembly slide 5 further has an optical alignment system 13, for example a camera, in order to register reference structures 14 such as bores or the like on the assembly surface 6 of the aircraft fuselage 1 and, on the basis thereof, to position the tool 4 relative to the assembly surface 6. The optical alignment system 13 can thus be used to perform a rough and/or fine positioning of the tool 4 at the desired assembly positions. A vertical alignment of the tool 4 is here at all times ensured by the assembly rails 2 and the assembly axes 3. In addition, the tool 4 can naturally have or offer, in the usual manner, further degrees of freedom in terms of the assembly. For instance, the tool 4 can be a drilling machine which is configured such that it is movable in a radial direction perpendicular to the assembly surface 6 and is configured, furthermore, with one or more rotational axes.

The assembly system 10 is faster and simpler than traditional, in particular robot-based, assembly systems, since, for the alignment of the tool 4, linear, curved structures (rails) are used, which structures predefine the motional capabilities of the tool 4 such that this is at all times automatically aligned perpendicular to the assembly surface. Elaborate holding devices, assembly stands and/or scaffolds, as well as complex metrological systems, can be avoided. There is thus provided an assembly system 10 which is markedly more robust, more rapid, more precise and more simple than traditional solutions based on robots and/or metrological approaches.

The assembly rails 2 and/or the assembly slide 5 can be provided in modular form. For instance, individual rail segments of just a few or some metres in length in the longitudinal direction or in the peripheral direction (cf. FIG. 3) can be arranged one behind another, wherein the individual segments can be differently curved, for instance in order to allow for a varying curvature of the aircraft fuselage 1. The rail segments or the assembly rails 2 can be formed, for instance, of a metallic material, for example aluminium. The assembly rails 2 can here be designed, in particular, in lightweight construction, so that individual rail portions weighing just a few kilograms are possible. In this way, the assembly system 10 is also able to be realized without great effort for fuselages which are complexly shaped according to choice. For instance, each module can comprise rail segments which are geometrically configured in accordance with the respective fuselage portion. In a corresponding manner, differently configured assembly slides 5, the assembly axes 3 of which are respectively optimized for a certain fuselage portion of the aircraft fuselage 1, can be provided. To the person skilled in the art, it will here be clear that, in other embodiments, an individual assembly slide 5 which is usable for all regions of the aircraft fuselage 1 can equally be provided. To this end, the assembly axes 3 of the assembly slide 5 can, for instance, be appropriately adapted to the present curvature of the respective fuselage portion and/or can independently adapt thereto.

Figure 2:
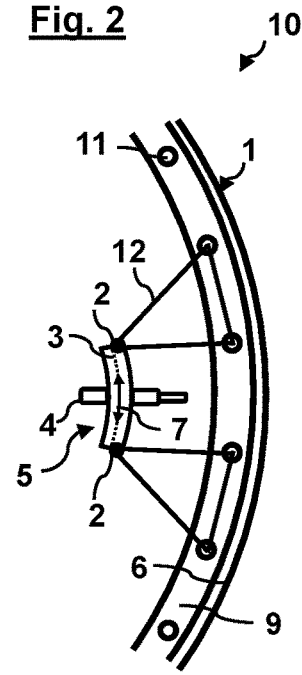
FIG. 2 shows a schematic side view of the assembly system from FIG. 1.
Figure 3:
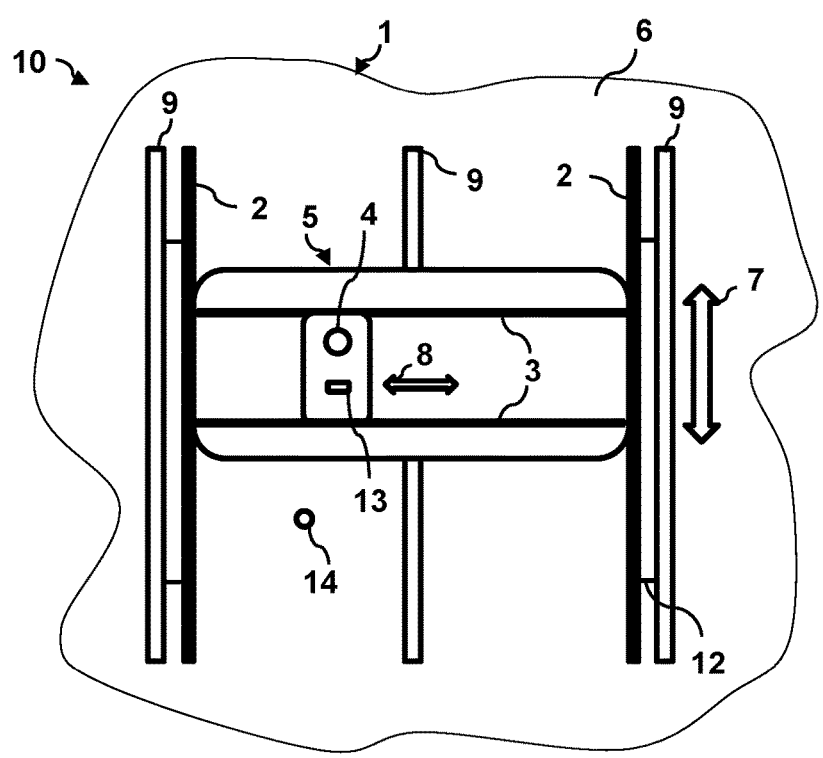
FIG. 3 shows a schematic front view of an assembly system according to a further embodiment of the invention.
Figure 4:
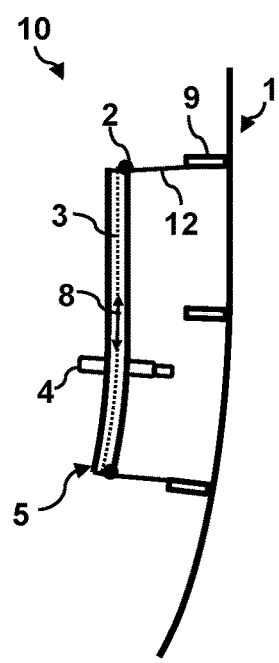
FIG. 4 shows a schematic top view of the assembly system from FIG. 3.

FIG. 3 shows a schematic front view of an assembly system 10 according to a further embodiment of the invention. FIG. 4 shows a corresponding top view of the assembly system 10. The figures here show, by way of example, a conically tapered tail region of an aircraft fuselage 1 (this tapers downwards in FIG. 4). Unlike the embodiment in FIGS. 1 and 2, the assembly rails 2 are in this exemplary embodiment aligned along the peripheral direction 7 and respectively fastened to an adjacent stiffening element 9 (a rib), i.e. the assembly rails 2, just like the ribs, are curved in the peripheral direction 7. In this embodiment too, an assembly slide 5 with a tool 4 sits on the assembly rails 2 and can slide along these (in this embodiment, thus in the peripheral direction 7). The assembly slide 2 has two assembly axes 3, which run perpendicular to the assembly rails 2 in the longitudinal direction of the aircraft fuselage 1. In this arrangement of the assembly system 10 in the aircraft fuselage 1, the assembly axes 3 are, in particular, of curved configuration. Whilst the assembly system 10 in FIGS. 1 and 2 is optimized for an assembly in the longitudinal direction 8 of the aircraft fuselage 1, the assembly system 10 of FIG. 3 is suitable for a production series in the peripheral direction 7, wherein the assembly axes 3 enable a displacement of the tool 4 in the longitudinal direction 8.

In the preceding detailed description, various features have been amalgamated in one or more examples in order to improve the stringency of the representation. It should here be clear, however, that the above description is merely illustrative, yet by no means limiting, in nature. It serves to cover all alternatives, modifications and equivalents of the various features and illustrative embodiments. In the light of the above description, many other examples will be immediately and directly clear to the person skilled in the art due to his specialist knowledge.

The illustrative embodiments have been selected and described in order to be able to, in practice, optimally represent the principles underlying the invention and their possible applications. As a result, experts can optimally modify and utilize the invention and its various illustrative embodiments in relation to the intended purpose of use. In the claims and the description, the terms "containing" and "having" are used as neutral-linguistic concepts for the corresponding terms "comprising". Furthermore, a use of the terms "a" and "an" should not fundamentally preclude a plurality of thus described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOL LIST 1 aircraft fuselage
2 assembly rail
3 assembly axis
4 tool
5 assembly slide
6 assembly surface
7 peripheral direction
8 longitudinal direction
9 stiffening element
10 assembly system
11 mounting bore
12 connecting element
13 alignment system
14 reference structure

The invention claimed is:
1. An assembly system for an automated internal assembly on a curved assembly surface of an aircraft fuselage, comprising:
two assembly rails, which are shaped in accordance with a curvature of the assembly surface of the aircraft fuselage such that the two assembly rails follow a longitudinal direction of the aircraft fuselage or a peripheral direction of the aircraft fuselage, so that the assembly rails are fastenable in the aircraft fuselage, along the longitudinal direction of the aircraft fuselage or along the peripheral direction of the aircraft fuselage, parallel to one another and parallel to the assembly surface of the aircraft fuselage;
a plurality of rigid connecting elements holding the two assembly rails and configured to be coupled to stiffening elements of the aircraft fuselage;
an assembly slide configured to slide along the assembly rails; and
a tool supported by the assembly slide and configured to perform an assembly step;
wherein the assembly slide has at least one assembly axis, along which the tool is configured such that the tool is movable relative to the assembly slide;

wherein the assembly axis is configured such that the assembly axis follows the curvature of the assembly surface of the aircraft fuselage, and wherein the two assembly rails comprise a plurality of rail segments configured to correspond geometrically to predefined fuselage portions, and wherein the two assembly rails are configured to be fastened to stiffening elements of the aircraft fuselage via assembly bores of the stiffening elements.

2. The assembly system according to claim 1, wherein the at least one assembly axis is arranged perpendicular to the assembly rails.

3. The assembly system according to claim 1, wherein the assembly slide has an alignment system configured to register a reference structure on the assembly surface of the aircraft fuselage and, on the basis thereof, to position the tool relative to the assembly surface.

4. The assembly system according to claim 1, wherein the at least one assembly axis is configured as a rail, and wherein the tool is configured to slide relative to the assembly slide along the at least one assembly axis.

5. The assembly system according to claim 4, wherein the at least one assembly axis comprises two assembly axes, between which the tool is supported by the assembly slide.

6. An aircraft fuselage, comprising:
a curved assembly surface;
two assembly rails fastened within the aircraft fuselage along a longitudinal direction of the aircraft fuselage or along a peripheral direction of the aircraft fuselage, parallel to one another and parallel to the curved assembly surface of the aircraft fuselage;
a plurality of rigid connecting elements holding the two assembly rails and configured to be coupled to stiffening elements of the aircraft fuselage;
an assembly slide configured to slide along the assembly rails over the curved assembly surface of the aircraft fuselage; and
a tool supported by the assembly slide and configured to perform an assembly step on the curved assembly surface of the aircraft fuselage;
wherein the assembly slide has at least one assembly axis, along which the tool is configured such that the tool is movable between the assembly rails relative to the assembly slide;
wherein the assembly axis is configured parallel to the curved assembly surface of the aircraft fuselage such that the assembly axis follows a curvature of the curved assembly surface of the aircraft fuselage, and
wherein the two assembly rails comprise a plurality of rail segments configured to correspond geometrically to predefined fuselage portions, and
wherein the two assembly rails are fastened to the stiffening elements of the aircraft fuselage via assembly bores of the stiffening elements.

7. The aircraft fuselage according to claim 6, wherein the stiffening elements are configured as ribs.

* * * * *